INVENTOR
EDWIN M. DEXTER

Nov. 12, 1968  E. M. DEXTER  3,410,289
PURE FLUID REMOTE CONTROL SYSTEM
Filed April 2, 1965  2 Sheets-Sheet 2
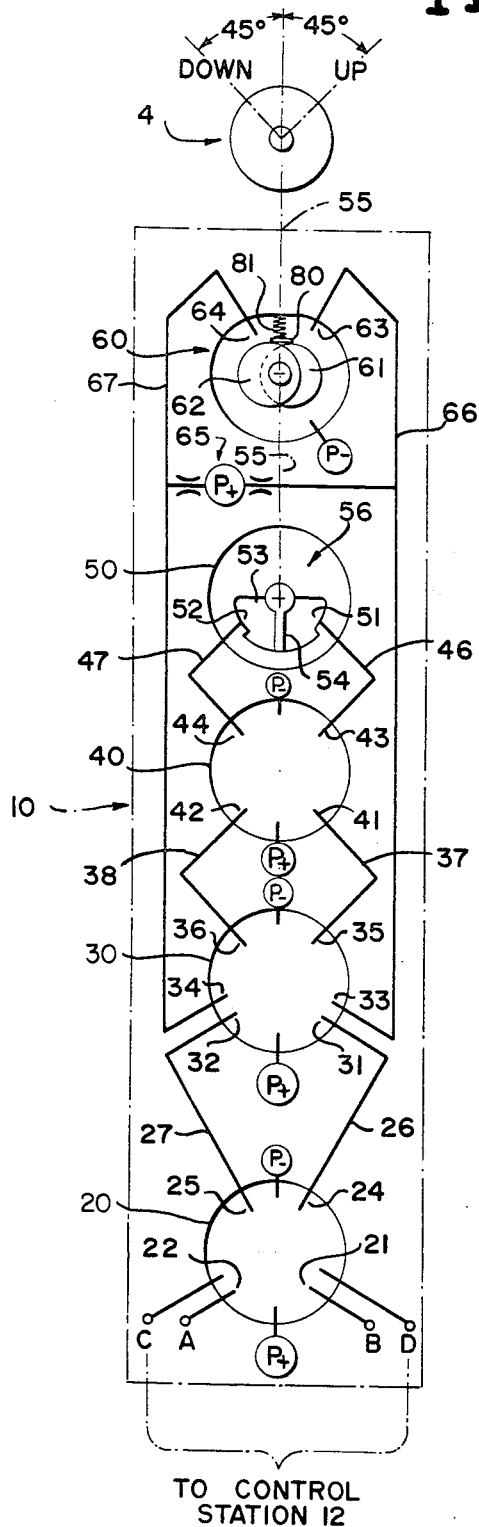
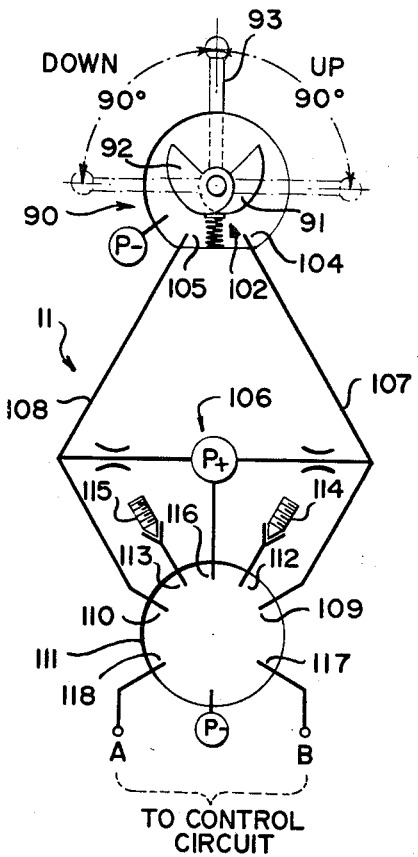
INVENTOR
EDWIN M. DEXTER
BY *Hurvitz & Rose*
ATTORNEYS United States Patent Office 3,410,289
Patented Nov. 12, 1968

3,410,289
PURE FLUID REMOTE CONTROL SYSTEM
Edwin M. Dexter, Silver Spring, Md., assignor to Bowles Engineering Corporation, Silver Spring, Md., a corporation of Maryland
Filed Apr. 2, 1965, Ser. No. 445,003
21 Claims. (Cl. 137—81.5)

ABSTRACT OF THE DISCLOSURE

A system for controlling the position of a movable member comprising a pure fluid element for producing a fluid positioning signal in response to the difference between a control signal and a position feedback signal. An additional feature comprises a variable pressure differential signal generator wherein a pair of cams are simultaneously movable to variable impede fluid flow from a pair of sensor nozzles, the impedance to flow from said nozzles being sensed, wherein said pressure differential signal is generated as a function thereof.

---

The present invention relates to pure fluid systems and, more particularly, to a remote control system for a hydraulic winch or similar device, which utilizes pure fluid elements.

It is desirable in a winch or hoisting device to have a number of auxiliary manual control stations at a substantial distance from the main control station of said device so that the operator may select an operating position which is best suited for his purposes. The provision of several remote control stations thus has an obvious advantage of increased efficiency in the utilization of the operator's time and energy. For example, a remote control station may be provided at each of several levels of the hold of a ship or similar storage area so that the operator may control the winch device from any level.

Known prior art devices for remote control of hoisting devices comprise complex and expensive electrical systems which generally consist of switches and motors for actuation of the winch control. These systems are generally limited in their application since they obviously require an electrical power source. Also, these electrical systems are subject to wear and the adverse effects of the atmosphere that reduces their reliability and increases the need for maintenance. Furthermore, these electrical systems must be insulated from service conditions, such as jolts and bumps, which would adversely affect their delicate electrical components.

As opposed to the prior art devices, overall system and component reliability of the apparatus of the present invention is very high since it is composed entirely of pure fluid elements. The system is generally maintenance free and appears to be capable of having the indeterminate service life usually attributed to a pure fluid system. For example, it is completely enclosed so that it is free of any influence caused by the surrounding atmosphere and is not affected by normal service conditions, such as jolts and bumps.

In addition to being highly reliable, the present pure fluid system has been found to have unusually high performance capabilities in interpreting a command signal at the remote station and accurately relaying it to the main control of the winch device.

The system, in addition, is economical to construct so that the original cost is not prohibitive. Also, the system occupies very little space and, in general, is of very simple construction. Furthermore, no outside power source is required since the system may draw its power directly from the hydraulic system of the hoisting device.

According to the present invention, a servo-motor and its control circuit of pure fluid elements is provided for actuation of a conventional fluid winch control, which may consist of an oscillating fluid valve that not only controls the direction of the winch but also the speed. The control circuit receives a control signal of the differential pressure or analog type from a suitable signal generator at the control station, which generator may be of the impedance type and will be discussed subsequently. This control signal is amplified and relayed to a summer amplifier where it is added to a feedback signal that always seeks equivalence to and opposite polarities from said control signal. The analog output signal of the summer amplifier is then relayed to the servo-motor which has an oscillating actuator element that operates the winch control as well as the feedback signal generator, which may also be of the impedance type. As the latter is oscillated said feedback signal automatically indicates the position of the actuator element of the servo-motor and continuously changes until it just equals the control signal with opposite polarities. At this point, the output signal of the summer amplifier disappears as the system is now balanced or stabilized. The actuator element of the servo-motor remains stationary in its new position until the control signal is changed to cause a new system imbalance whereupon the foregoing system stabilization process once again occurs.

As indicated above, the actuator element of the servo-motor in the present invention has a dual purpose. It is not only used as the output element to operate the winch control but is utilized in a novel manner to operate a feedback signal generator that determines the final position of said actuator element. Thus, one moving part, the actuator element, operates not only the final control element but also determines its final position without other moving parts. The advantage of having only one moving part, which is the output element and control element combined, is self-evident in terms of high reliability and low maintenance.

The heart of the novel control circuit is the summer amplifier which receives the two signals; that is, the control signal and the feedback signal, and adds them together in a precise manner. The streams of fluid representing the signals, collectively control the power stream in an ingenious manner to produce the proper output signal that actuates the servo-motor. Since the summing function is performed entirely within one fluid element, a very compact and simple control circuit is provided. In addition, because the servo-motor control circuit is a pure fluid system, there is no wear or deterioration of the control circuit elements themselves. Thus, the system has a substantially infinite lifetime usually accorded to a pure fluid system. More importantly perhaps, the pure fluid components are not subject to the usual variances inherent in delicate electronic components which may cause false and spurious signals that affect the accuracy of the overall system.

The differential pressure signal generator of the impedance type is an important subcombination feature of this invention. In this invention, a differential pressure signal is realized by looking at the back pressure from dual sensor streams interacting via nozzles against variable cam surfaces. As the cams are turned from dead center with one cam surface receding from and the other cam surface proceeding toward said nozzles, the difference in the pressures of the power streams resulting from the difference in impedances constitutes a differential pressure signal at suitable output nozzles. As above indicated, this signal generator is utilized in the present invention as the control signal generator and as the position indicator for the actuator means of the servo-motor.

The cams of the feedback signal generator in the servo-motor control circuit are preferably integral with the actuator element so that the precise position indication is always given. This arrangement eliminates any need for costly adjustment of mechanical linkage, such as gearing between the servo-motor and the feedback generator which might otherwise be necessary to correct for misalignment or wear.

The signal generator at the remote control station is a high performance impedance type generator with a provision for adjusting the gain of an associated amplifier thereby affording an adjustment for different length remote control lines to the control circuit. This generator is made from like fluid elements used in the main control circuit for a very efficient and compact device.

Broadly, therefore, it is an object of the present invention to provide a remote control system of the pure fluid type for a winch or hoisting device.

It is another object of this invention to provide a pure fluid control system for operating a control member in response to a pure fluid signal.

It is still another object to provide a fluid signal generator of the impedance type for generating a differential pressure or analog fluid signal.

Still another object of the present invention is to provide an apparatus that utilizes the position of the actuator means in a control system to provide a fluid signal that determines the final position of said actuator means.

Yet another object is to provide a pure fluid control means for a reversible valve that utilizes simple cam means for producing a variable control signal and for stabilizing said oscillating means in response to the magnitude of said control signal.

The above and still further objects, features and advantages of the present invention will become apparent upon consideration of the following detailed description of one specific embodiment thereof, especially when taken in conjunction with the accompanying drawings, wherein:

FIGURE 2 is a schematic illustration of the servo-motor and the pure fluid control circuit for said motor and the final control element according to the present invention;

FIGURE 5 is a schematic illustration of the differential pressure fluid signal generator of the remote control station of the present invention.

Figure 1:
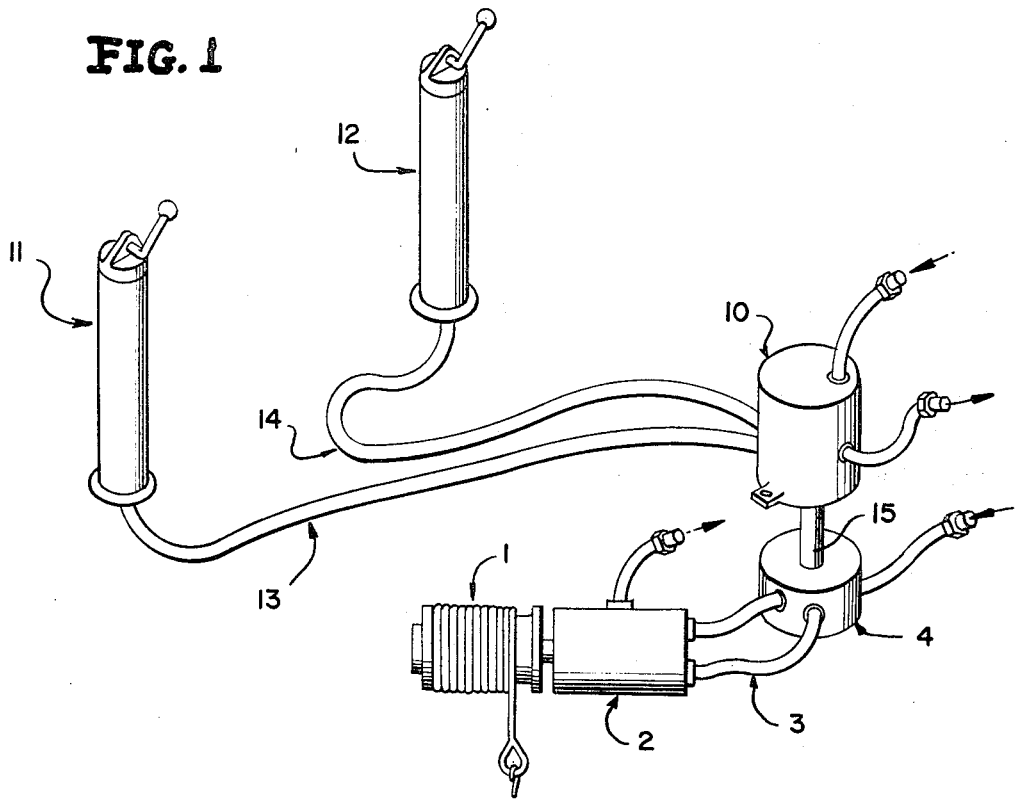
FIGURE 1 is a perspective view of the entire system of the present invention.

Referring now to FIGURE 1 for a more complete understanding of the invention, there is illustrated a view of the entire system. In the particular example under consideration, the direction and speed of a hoisting device is controlled by a pure fluid remote control system, although it is to be understood that any device with an oscillatable input means may be controlled in a manner similar to that demonstrated. The only change required to adapt the system illustrated to a different type of device would be in the final control element.

In FIGURE 1, conventional winch or hoisting device 1 is caused to rotate in either a clockwise or counterclockwise direction by fluid motor 2 which, for example, may comprise two sets of turbine blades that are adapted to be impinged by two different fluid power streams. Two fluid lines 3 are attached to the motor 2 for the purpose of supplying the power streams to said motor from a control element, such as reversible valve 4. Thus, it can be seen by supplying fluid via the valve 4 to the desired line 3, the motor 2 may be operated in either direction. The valve 4 is also capable of varying the momentum of the power streams as they impinge on the turbine blades of said motor 2, so that the winch 1 may be operated at varying speeds.

The valve 4 is actuated and controlled by a pure fluid control system generally designated by numerals 10–14 in FIGURE 1. The control system 10–14 is preferably provided with a power source from the winch fluid supply, which insures that the control means is operable under all conditions wherein the winch is operable. It is to be understood, however, that regardless of the type of fluid being used in the winch device, any suitable fluid could be used as the working medium in the pure fluid control system 10–14, since the only connection between said control system and the winch system is mechanical shaft 15, which oscillates the valve 4 through 90°, as will be explained in detail later.

In said pure fluid control system, the servo-motor and pure fluid control circuit, generally designated by reference numeral 10, is provided with fluid control signals from remote control stations 11, 12 via connector tube bundles 13, 14, respectively. Thus, an operator at the station 11 or 12 produces a control signal which is relayed to the control circuit and motor 10 and there transformed to oscillatory motion at the shaft 15 which, in turn, operates the valve 4. Said valve permits the desired fluid power stream to actuate the motor 2, which turns the winch 1.

With reference to FIGURE 2, the novel servo-motor and its pure fluid control circuit 10 will now be explained, bearing in mind that a differential pressure or analog fluid signal is the initiating control signal for said control circuit. Said signal consists of a static pressure difference between two fluid streams that exists at the input points A, B or C, D of the control circuit. For present purposes, we need only consider the pair of input points A, B which receive the control signal from remote control station 11, it being understood that the pair of input points C, D receive a similar control signal from remote station 12.

Proportional or analog amplifier 20 receives the differential pressure signal at points A, B via control nozzles 21, 22. Additional nozzles may be provided to receive the control signal from the control station 12 via the input points C, D. The control nozzles 21, 22 are positioned in such a manner that their control streams are completely decoupled from any interaction effect with control streams of the additional control nozzles that may be provided, so that plural control stations are feasible.

It should be recognized that only one control station 11 or 12 can be utilized at any one given time, since if plural control signals are received by the summer amplifier 20 at the same time, a sum or addition of the signals would occur resulting in a spurious output signal. Suitable provisions could be made to prevent two control signals from occurring at the same time, but this will not be discussed further here since it forms no part of the present invention.

The proportional amplifier 20 amplifies any control signal received from the nozzles 21, 22 by means of a positive pressure source, generally designated by P+.

A power stream is issued from power nozzle 23 and the control streams from nozzles 21, 22 cause said power stream to be proportioned to receiving ducts 24, 25 in accordance with the control signal in the conventional manner. A center passage or dump, generally designated by P—, may be provided and is connected to a sump or vented to atmosphere, as desired, to remove any unwanted fluid from the system.

As a further illustration of the operation of a proportional amplifier in general, and the proportional amplifier 20 in particular, assume that a control signal exists wherein the static pressure at input point A is greater than the static pressure at input point B. Then the power stream issuing from the power nozzle 23, is deflected to the right, as seen in FIGURE 2, toward the receiving duct 24 and away from the receiving duct 25 so that the high velocity portions of the center regions of the power stream will be seen by receiving duct 24, which in turn causes the static pressure at said duct 24 to be greater than the static pressure in the duct 25. Expressed in another manner, the pressure at the duct 24 has a positive polarity and the pressure at the duct 25 has a negative polarity, when using the null or no signal condition as a base.

Figure 3:
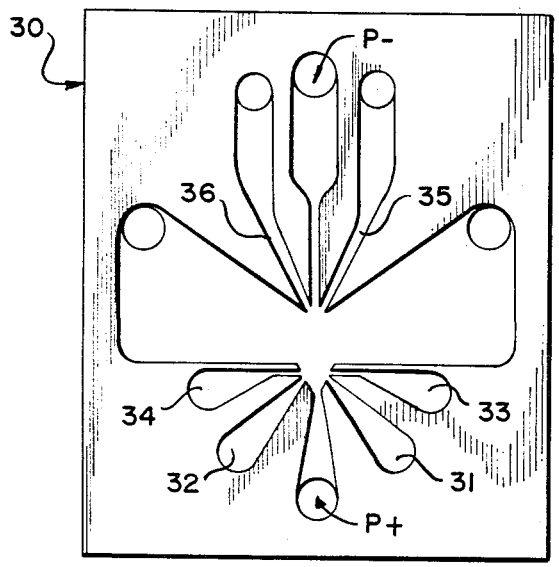
FIGURE 3 is a detailed illustration of the summer amplifier used in said control circuit.

Connecting passages 26, 27 interconnect the amplifier 20 with the heart of the motor control circuit, which comprises a proportional amplifier 30 with control nozzles 31, 32, receiving ducts 35, 36, power source P+ and dump P—. As shown more clearly in FIGURE 3, in addition to the control nozzles 31, 32, this amplifier has additional feedback nozzles 33, 34 which makes it a summing device or summer amplifier, as it is sometimes called. Thus, the receiving ducts 35, 36 see a differential pressure signal which is a function of two differential pressure signals rather than only one, i.e. the signal at the control nozzles 31, 32 plus the signal at the feedback nozzles 33, 34 generate the signal received at ducts 35, 36.

The addition and amplification in the summer amplifier 30 gives a differential pressure signal at ducts 35, 36 that is the precise sum of the input signal and the feedback signal. This is possible by designing the amplifier so that the streams issuing from control nozzles 31, 32 are completely decoupled from the streams issuing from the feedback nozzles 33, 34, i.e. each stream interacts with the power stream in the same manner as if the other stream was not present. In this manner, the control streams collectively affect the power stream to produce the output signal desired within the confines of only one very simple pure fluid element.

A third stage of the control circuit receives the differential pressure signal of the amplifier 30 via connecting passages 37, 38 and comprises still another proportional amplifier 40 with conventional control nozzles 41, 42, receiving ducts 43, 44, power source P+, and dump P—. The signal of the amplifier 40 is transferred via connecting passages 46, 47 to a servo-motor, generally designated by reference numeral 50. The purpose of the amplifier 40 is to amplify the signal received from the summer amplifier 30 to account for any fluid friction losses and to smooth out and stabilize said signal for operation of the motor 50.

In the motor 50, orifices 51 and 52 of the passages 46, 47, respectively, open into enclosed arcuate chamber 53, in which vane 54 is mounted by control shaft 55 for 90° oscillating movement in the preferred embodiment. When the pressures on both sides of the vane 54 are equal, the actuator of said motor; that is, the vane 54 and the control shaft 55, generally designated by reference numeral 56, is stabilized and there is no movement. However, if a differential pressure signal appears across orifices 51, 52 an unstable condition is produced and the vane is moved toward the low pressure side. Whatever amount of fluid flows out of one orifice 51 or 52, it readily flows into the other orifice 52 or 51, the oscillating vane 54 producing the flow out of chamber 53 in either case.

The actuator 56 has the dual function of actuating feedback signal generator 60, which will be described in detail later, and the oscillatory valve 4. Thus, it can be seen, that when there is a differential pressure signal at orifices 51, 52 and the pressure in chamber 53 is different on opposite sides of the vane 54, the feedback signal generator 60 and the valve 4 will be actuated through the control shaft 55 accordingly. With only one moving part to perform the two necessary functions of providing a feedback signal and operating the final control element, a very compact and efficient device is provided in accordance with the present invention.

While the actuator 56 has been disclosed as being operable through a 90° control span; that is, 45° in two directions from the dead center off position, it is to be understood that other degrees of movement of said actuator could be obtained in accordance with the present invention. For example, the vane 54 could be oscillated through almost 360° by designing the chamber 53 with a dividing sector only large enough to accommodate the passages 46, 47 and to restrain the vane 54 from rotary movement.

The valve 4 not only operates the winch motor 2 in the up and down direction when moved from the dead center "off" position of FIGURE 2, but is also capable of operating said motor at varying speeds in both directions. For this reason, the valve is adapted to be positioned at an infinite number of positions for speed control within the 45° control span for each direction, as shown in FIGURE 2. The feedback signal generator 60 limits the oscillation of the actuator 56 and the valve 4 in either direction for this speed control in a novel manner to be described now.

Figure 4:
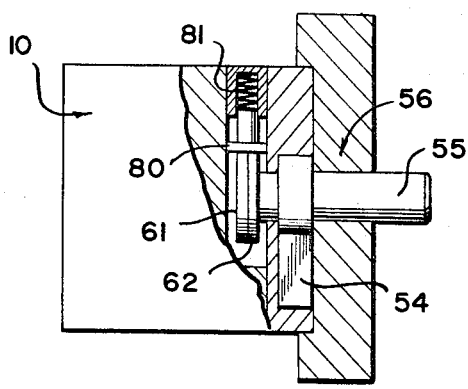
FIGURE 4 is a partial cross-sectional illustration of said motor and control circuit showing the servo-motor in cross-section.

The feedback generator 60 comprises two cams 61 and 62 preferably integrally mounted on the control shaft 55, which as previously pointed out, also mounts the actuator vane 54 to form the actuator 56, as best shown in FIGURE 4. Since the cams 61, 62 and the vane 54 rotate in unison, the position of said cams corresponds to the position of the vane 54 at all times. It follows that by sensing the position of the cams 61, 62 the position of the actuator 56 can be determined and limited as desired.

The feedback signal indicating the position of the actuator 56 is realized by looking at the back pressure from dual sensor streams interacting via sensor nozzles 63, 64 against the variable cam surfaces of the cams 61, 62, respectively. The sensor streams are supplied from reduced power source, generally designated by reference numeral 65, through feed passages 66 and 67, each of which has a sensor nozzle 63 or 64 and a feedback nozzle 33 or 34. As the actuator 56 and the cams 61, 62 are turned from the dead center position of FIGURE 2 with one cam surface receding from and the other cam surface proceeding toward the sensor nozzles 63 or 64, the back pressures in the sensor streams change as a result of this change in impedance, so that a differential pressure signal is generated across the feedback nozzles 33, 34.

Now, assuming that the pressure signal at the control nozzles 31 is different from the pressure signal at control nozzle 32 as a result of a differential pressure signal being received from the control station 11, the pressure signals at each of the feedback nozzles 33 or 34 from the feedback generator 60 seeks the opposite polarity from each of the pressure signals at said control nozzles 31 or 32, respectively. Therefore, for example, when the pressure at the control nozzle 31 is greater than the null condition or has positive polarity, the pressure at the nozzle 33 is of negative polarity. Accordingly, when the pressure at the control nozzle 32 on the opposite side of the amplifier 30 has a negative polarity, then the pressure at nozzle 34 is of positive polarity. Once the differential pressure signal across the control nozzles 31, 32 is set, the differential pressure signal across feedback nozzles 34, 35 will automatically become the same but with opposite polarities, so that said signals in effect cancel each other out. At this point, the circuit is stabilized since the receiving ducts 35, 36 see a no signal or null condition as a result of the addition of the signals, and pressures at the opposite sides of vane 54 are equal.

Provision is made for returning the cams 61, 62 of the generator 60 to the dead center position of FIGURE 2 when there is a loss of the power source P+. As shown in FIGURES 2 and 4, slidable shoe 80 engages both of the cams 61 and 62 at the dead center position, and is biased against said cams by spring 81. As the cams 61, 62 are moved in either direction from dead center position, the slidable shoe 80 is urged upwardly against said spring 81 by one or the other of said cams 61 or 62. Thus, in case of a loss of power source P+, the shoe 80 urges the cams to the dead center position of FIGURE 2 so that the valve 4 will be returned to its "off" position automatically.

To summarize the operation of the control circuit 10, assume that a differential pressure signal comprising a positive polarity at point A and a negative polarity at point B is applied, then there is initially an amplified differential pressure signal across the servo-motor 50 comprising a positive polarity of orifice 51 and a negative polarity at orifice 52. As the pressure in chamber 53 to the right of the vane 54 is thus greater than the pressure to the left of the vane 54, as viewed in FIGURE 2, said vane 54 moves to the left and toward the region of the lower pressure so that the valve 4 is actuated to the left also by the shaft 55. Thus, the vane 54 and control shaft 55 form an actuator 56 for said valve 4.

The cams 61 and 62 of the feedback generator 60 being an integral part of the shaft 55 turn with the vane 54 so that one cam surface approaches the nozzle 64 and the other cam surface recedes from nozzle 63, as can be seen in FIGURE 2. As the impedances are changed in this manner, the pressure at nozzle 34 of the summer amplifier 30 becomes positive polarity and the pressure at nozzle 33 of said amplifier 30 becomes negative polarity. Since the pressure at said amplifier's control nozzle 31 is positive polarity and the pressure at the control nozzle 32 is negative polarity due to the differential pressure signal at points A, B, it will be seen that the adjacent amplifier control and feedback nozzles 31, 33, respectively, have opposite polarities as do the nozzles 32, 34 on the opposite side of the amplifier.

According to the initial difference between the pressures at the input points A and B and the corresponding pressure difference initially across vane 54, the shaft 55 continues to turn the cams 61, 62 until the point is reached where the differential pressure signal across the nozzles 33, 34 just equals the differential pressure signal across nozzles 31, 32. At this point, since the pressures at adjacent nozzles 31, 33 or 32, 34 have opposite polarities, the addition of the two signals in the amplifier 30 results in a no signal or null condition at the receiving ducts 35, 36 and also across the vane 54 in the chamber 53. Because the pressures on opposite sides of the vane 54 are now equal, the shaft 55 along with cams 61, 62 and valve 4 will remain in this stabilized position until a different signal is applied across input points A, B.

A preferred embodiment of the remote control station 11 is shown in FIGURE 5, it being understood that the station 12 may be identical and thus need not be discussed here. The pressure signal generator, generally designated by reference numeral 90, is of the impedance type and operates in a manner somewhat similar to the feedback signal generator 60, as indicated above, in that it utilizes two cams 91, 92, which are connected together for oscillatory movement, to produce the differential pressure signal. These cams are oscillated by hand lever 93 in the manner desired by the operator to produce either an upward or downward movement of the winch 1. As illustrated in FIGURE 5, the lever 93 and the attached cams 91, 92 oscillate through a total of 180° in the preferred embodiment, so that a 90° span of infinite positions of the cams is available for producing an infinite number of differential pressure signals in the two directions of the winch; that is, up and down.

A very nice regulation of the actuator 56 of the motor 50 is possible in the present system by providing the cams 91, 92 of the signal generator 90 with twice the span of oscillation as the vane 54. In other words, the vane 54 moves only half as far as the cams 91, 92 of said generator so that the operator is able to effect small precise movements of the actuator 56 with larger, less detailed movements of the handle 93. In this manner, the sensitivity of the system is enhanced. Of course, greater or lesser degrees of sensitivity can be obtained by varying the span of oscillation of the actuator 56 or the cams 91, 92 and handle 93 of the generator 90.

A spring return may be provided to return the hand lever 93 to the center neutral position when it is released by the operator. A sliding shoe and spring arrangement, generally designated by reference numeral 102, which is similar in operation to the sliding shoe and spring 80, 81 of feedback generator 60, is shown for this purpose.

The cams 91 and 92 are monitored or sensed by sensor streams issuing from sensor nozzles 104 and 105. These sensor streams are supplied by reduced power source 106 through the feed passages 107 and 108. Suitable feed nozzles 109, 110 are provided on the feed passages 107, 108, respectively, and supply the differential pressure signal to pre-amplifier 111.

The differential pressure signal results from the back pressure of the fluid streams in passages 107, 108. As the position of the control surfaces of the cams 91, 92 varies in respect to the nozzles 104, 105, the impedance changes thereby producing a variable differential pressure signal across control nozzles 109, 110.

The pre-amplifier 111 is of the proportional type having power nozzle 116, receiving ducts 117, 118 and may be a summer amplifier for convenience, with two additional adjustable control nozzles 112, 113 being connected to a suitable low pressure source through adjusting screws 114, 115, respectively. The gain of the amplifier 111 has been found to be greatly enhanced by the introduction of these low pressure sources into the boundary layer regions of the power stream adjacent the power nozzle 116. This phenomena has been attributed to the fact that the power stream becomes more flexible under the influence of low pressure boundary layer regions and thus is more easily proportioned to said receiving ducts with the low power control streams, as more fully explained by John R. Colston in the co-pending case Serial No. 301,743, filed August 13, 1963, now Pat. No. 3,275,013 and entitled "High Gain Pure Fluid Amplifier."

By adjusting the screws 114, 115, the power level of the pre-amplifier 111 can be adjusted to the length of the control station 11 to the corresponding points A, B in the control circuit. If the signal feed tubes in the tube bundle 13 are relatively long, say in the order of 150 feet, the gain of the amplifier is adjusted up so that the signal is at the proper level when it is received at the control circuit at A, B. Conversely, if shorter lines are used for a remote station, say station 12, then the gain of the amplifier can be decreased.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A fluid system for controlling the position of a movable member in response to a first fluid control signal comprising:
   actuator means, movable from a reference position in response to a second fluid signal, for determining the position of said movable member;
   feedback means for providing a fluid feedback signal as a function of the displacement of said actuator means from said reference position;

analog pure fluid amplifier means for providing said second fluid signal as a function of the difference bebetween said first and feedback signals, whereby to provide a null balance system.

2. The system according to claim 1 further comprising means for providing said first fluid control signal as a function of either of a pair of fluid input signals, said last mentioned means comprising a fluid amplifier having two input means for receiving respective ones of said pair of fluid input signals and output means for providing said first fluid control signal.

3. The system according to claim 2 wherein said pair of input signals are each pressure differential signals and said first fluid control signal is a pressure differential signal, said two input means each comprising a pair of control ports and said output means comprising a pair of output passages.

4. The system of claim 2 wherein said feedback means comprises:
a pair of nozzles adapted to issue a respective pair of sensor streams;
a shaft movable with said actuator means for driving said movable member;
a pair of movable elements disposed adjacent respective ones of said pair of nozzles and secured to said shaft so as to be movable therewith, said elements having variable surfaces for variably restricting flow from said nozzles in accordance with the position of said shaft;
fluid passage means responsive to the flow through said nozzles for providing said fluid feedback pressure differential.

5. The system of claim 1 wherein said first fluid control signal and said feedback fluid signal each comprise pressure differential signals and wherein said analog pure fluid amplifier means includes first and second pairs of control nozzles, said first fluid differential signal being connected to said first pair of control nozzles and said fluid feedback differential signal being connected to said second pair of control nozzles in opposite sense to said first fluid signal.

6. The system of claim 5 further comprising further fluid amplifier means providing said first fluid control signal, said further amplifier means comprising a power nozzle for issuing a power stream, two pairs of control ports wherein one port of each pair is positioned on an opposite side of said power stream from the other port of each pair, means for applying two fluid differential input signals to respective pairs of control ports, and output means for providing said first fluid control signal as a function of either of said two fluid differential input signals.

7. The system of claim 5 further comprising control means for generating said first fluid control signal including:
a pair of nozzles each adapted to issue a stream of fluid;
actuable means for varying the impedance to fluid flow from said pair of nozzles in opposing senses;
fluid passage means responsive to fluid flow from said pair of nozzles for providing a differential fluid pressure signal.

8. The system of claim 7 further comprising a pure fluid amplifier for amplifying the differential fluid pressure signal provided by said fluid passage means, said pure fluid amplifier including adjustment means for controlling the gain thereof.

9. The system of claim 7 wherein said actuable means comprises a pair of cam members rotatable by a common means, each of said cam members being disposed adjacent a respective one of said pair of nozzles, and presenting varying surfaces to said pair of nozzles upon rotation of said cam members by said common means.

10. The system of claim 5 wherein said feedback means comprises:
a source of pressurized fluid;
a pair of sensor nozzles in fluid communication with said source for issuing fluid sensor streams;
cam means movable with said actuator means for varying the impedance to fluid flow at said sensor nozzles;
and fluid passage means responsive to fluid flow at said sensor nozzles for conducting said fluid feedback signals to said second pair of control nozzles.

11. The system of claim 10 wherein said actuator means comprise a vane rotatable in an arcuate chamber and a rotatable shaft secured to said vane for moving said movable member.

12. The system of claim 11 wherein said second fluid signal is a pressure differential signal produced by said analog pure fluid amplifier means, said second fluid signal being connected to a pair of fluid input ports communicating with said arcuate chamber on opposing sides of said vane.

13. A system for controlling the position of a movable member comprising:
control means for generating a control fluid pressure differential;
feedback means for generating a feedback fluid pressure differential as a function of the position of said movable member;
analog pure fluid amplifier means for providing an output fluid pressure differential as a function of the difference between said control and feedback pressure differentials;
actuator means movable in response to said output fluid pressure differential for positioning said movable member.

14. A device for generating differential fluid pressure signals comprising:
a source of fluid under pressure;
first and second sensor nozzles communicating with said source for issuing respective first and second sensor streams;
first and second cam members each having a surface of predetermined shape disposed adjacent a respective one of said sensor nozzles such that motion of said cam members along a given axis presents varying impedances to fluid flow from said nozzles;
means for simultaneously moving said cam members along said given axis in either of two directions such that movement of said cam members in a first of said directions increases impedance to flow at said first sensor nozzle and decreases impedance to flow at said second sensor nozzle and movement of said cam members in said second direction increases impedance to flow at said second nozzle and decreases impedance to flow at said first nozzle;
first and second fluid sensor passages connected to respective locations between said source and said first and second sensor nozzles for conducting said differential fluid pressure signals as a function of the position of said cam members.

15. The device of claim 14 further comprising means for restoring said cam members to a reference position upon deactivation of said means for moving.

16. The device of claim 14 further comprising pure fluid amplifier means for amplifying the differential fluid pressure signals conducted by said first and second fluid sensor passages.

17. The device of claim 14 wherein said given axis is a common axis of rotation for both said cam members and wherein said means for moving is capable of rotating said cam members 90° in either of said two directions.

18. The device of claim 17 wherein said means for moving comprises a hand-operated lever, a rotatable shaft extending along said axis of rotation, and means for securing said cam members and said lever to said shaft such that rotary motion of said lever about said axis of rotation produces like motion in said cam members.

19. The device of claim 18 further comprising a spring fixedly positioned with respect to said cam members and a shoe member secured to said spring and urged thereby against said cam members, said shoe member engaging said cam members so as to permit sliding motion of said cam members against said surface, said spring having sufficient compressive force to cause said cam member to return to a reference position in the absence of force application to said lever.

20. The device of claim 19 wherein said cam members in said reference position permit equal amount of flow from said sensor nozzles to thereby render said differential fluid pressure signal zero.

21. The device of claim 19 wherein said first and second fluid sensor passages are connected to respective control stream input ports of an analog pure fluid amplifier.

References Cited

UNITED STATES PATENTS

| | | | |
|---|---|---|---|
| 2,889,815 | 6/1959 | Lloyd | 92—122 X |
| 3,004,547 | 10/1961 | Hurvitz | 137—81.5 X |
| 3,063,422 | 11/1962 | Gregowski et al. | 92—121 X |
| 3,124,999 | 3/1964 | Woodward | 137—81.5 X |
| 3,159,168 | 12/1964 | Reader | 137—81.5 |
| 3,185,166 | 5/1965 | Horton et al. | 137—81.5 |
| 3,215,045 | 11/1965 | Lissau | 92—120 X |
| 3,223,101 | 12/1965 | Bowles | 137—81.5 |
| 3,258,023 | 6/1966 | Bowles | 137—81.5 |
| 3,260,271 | 7/1966 | Katz | 137—81.5 |
| 3,275,015 | 9/1966 | Meier | 137—81.5 |

SAMUEL SCOTT, *Primary Examiner.*